United States Patent
Nakagawa et al.

(10) Patent No.: US 9,185,602 B2
(45) Date of Patent: Nov. 10, 2015

(54) TRANSMISSION DEVICE, BANDWIDTH CONTROL METHOD AND COMPUTER PROGRAM

(75) Inventors: Koichi Nakagawa, Tokyo (JP); Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 13/700,610

(22) PCT Filed: Apr. 22, 2011

(86) PCT No.: PCT/JP2011/059947
§ 371 (c)(1),
(2), (4) Date: Nov. 28, 2012

(87) PCT Pub. No.: WO2011/148748
PCT Pub. Date: Dec. 1, 2011

(65) Prior Publication Data
US 2013/0077559 A1  Mar. 28, 2013

(30) Foreign Application Priority Data

May 28, 2010 (JP) .................................. 2010-123255

(51) Int. Cl.
*H04W 28/20* (2009.01)
*H04L 12/801* (2013.01)
*H04L 12/825* (2013.01)

(52) U.S. Cl.
CPC .............. *H04W 28/20* (2013.01); *H04L 47/10* (2013.01); *H04L 47/12* (2013.01); *H04L 47/25* (2013.01)

(58) Field of Classification Search
USPC ......................................................... 370/315
See application file for complete search history.

(56) References Cited

U.S. PATENT DOCUMENTS

| | | | |
|---|---|---|---|
| 7,719,986 B2 | 5/2010 | Hirose et al. | |
| 2001/0044835 A1* | 11/2001 | Schober et al. | 709/217 |
| 2002/0051449 A1* | 5/2002 | Iwata | 370/389 |
| 2002/0085496 A1* | 7/2002 | Jamp et al. | 370/235 |
| 2003/0007453 A1* | 1/2003 | Ogier et al. | 370/229 |
| 2003/0016630 A1* | 1/2003 | Vega-Garcia et al. | 370/252 |
| 2003/0058871 A1* | 3/2003 | Sastry et al. | 370/401 |

(Continued)

FOREIGN PATENT DOCUMENTS

| | | |
|---|---|---|
| CN | 1744578 | 3/2006 |
| JP | 2003-258881 | 9/2003 |

(Continued)

OTHER PUBLICATIONS

JP Office Action dated Aug. 6, 2013, with English translation; Application No. 2012-517203.

(Continued)

*Primary Examiner* — Jenee Williams
(74) *Attorney, Agent, or Firm* — Young & Thompson

(57) ABSTRACT

In a transmission network of a multi-hop connection in which a transmission bandwidth between relay stations changes, it is possible to prevent congestion from occurring due to a change in the transmission bandwidth between the relay stations. A transmission device connected to a network constituted of a plurality of relay stations includes a transmission section configured to transmit a signal to the network, and a bandwidth control section configured to control a transmission bandwidth of the transmission section based on a lowest transmission bandwidth among transmission bandwidths between the relay stations.

7 Claims, 12 Drawing Sheets

(56) References Cited

U.S. PATENT DOCUMENTS

| | | | |
|---|---|---|---|
| 2003/0202469 A1* | 10/2003 | Cain | 370/230 |
| 2004/0109413 A1 | 6/2004 | Hierholzer et al. | |
| 2005/0099949 A1* | 5/2005 | Mohan et al. | 370/236.2 |
| 2006/0056434 A1 | 3/2006 | Hirose | |
| 2006/0268871 A1* | 11/2006 | Van Zijst | 370/390 |
| 2007/0076693 A1* | 4/2007 | Krishnaswamy | 370/352 |
| 2008/0107063 A1* | 5/2008 | Oleszczuk | 370/315 |
| 2009/0003241 A1* | 1/2009 | Teng | 370/254 |
| 2009/0252078 A1* | 10/2009 | Lim et al. | 370/315 |
| 2010/0034115 A1* | 2/2010 | Busch | 370/252 |
| 2010/0039935 A1* | 2/2010 | Davison et al. | 370/228 |
| 2010/0046533 A1* | 2/2010 | Kuramoto et al. | 370/401 |
| 2010/0074105 A1* | 3/2010 | Periyalwar et al. | 370/315 |
| 2010/0284423 A1* | 11/2010 | Yokotani et al. | 370/468 |
| 2012/0014260 A1* | 1/2012 | Enomoto | 370/241.1 |
| 2014/0241165 A1* | 8/2014 | Osswald | 370/236.2 |

FOREIGN PATENT DOCUMENTS

| | | |
|---|---|---|
| JP | 2005-328458 | 11/2005 |
| JP | 2007-536878 | 12/2007 |
| JP | 2008-078966 | 4/2008 |
| WO | WO02/25878 | 3/2002 |
| WO | WO 2005/112326 | 11/2005 |

OTHER PUBLICATIONS

International Search Report, PCT/JP2011/059947, May 24, 2011.

Kouji Yata, "Multi Service IP Network ni Okeru Tekiogata Hinshitsu Seigyo Hoshiki", NTT R&D, The Telecommunications Association, vol. 50, No. 12, Dec. 10, 2001, pp. 985 to 992, '5 Traffic Jokyo no Shutoku Hoho', fig. 9.

Chinese Office Action dated Jul. 15, 2014 in corresponding Chinese Patent Application No. 201180026586.3 with English translation of Chinese Office Action.

* cited by examiner

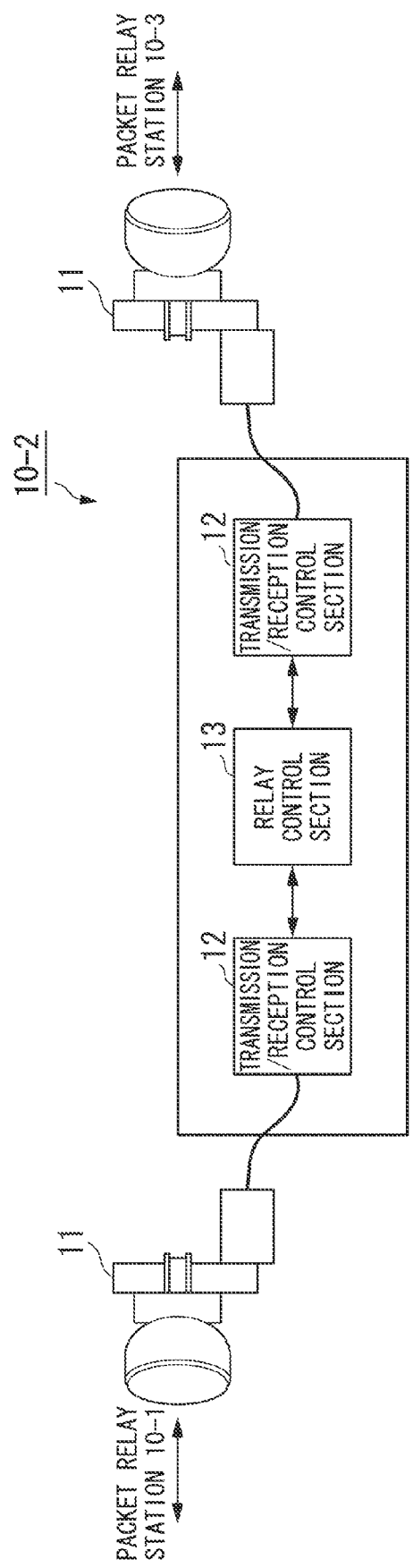

TRANSMISSION DEVICE, BANDWIDTH CONTROL METHOD AND COMPUTER PROGRAM

TECHNICAL FIELD

The present invention relates to technology for controlling transmission of a protocol data unit (PDU) such as a packet or a frame.

BACKGROUND ART

In the related art, technology for performing maintenance or management using an Ethernet (registered trademark) operations, administration and maintenance (OAM) frame in a packet transmission network is proposed (see Patent Document 1). In addition, in a wireless packet transmission network of a multi-hop connection, a wireless link state fluctuates according to weather fluctuation or the like between relay stations. In order to implement appropriate wireless packet transmission according to this fluctuation, adaptive multi-rate (AMR) has been proposed. In AMR, wireless packet transmission in which a communication rate and a resistance characteristic are balanced is implemented by adaptively changing a modulation/demodulation scheme according to a wireless link state.

DOCUMENTS OF THE PRIOR ART

Patent Documents

[Patent Document 1] Japanese Unexamined Patent Application, First Application No. 2007-536878

DISCLOSURE OF INVENTION

Problem to be Solved by the Invention

However, AMR of the related art has the following problems. Because the modulation/demodulation scheme is adaptively changed according to the wireless link state in AMR, a transmission bandwidth fluctuates according to this change. However, a transmission bandwidth does not fluctuate in a transmission path other than the transmission path between relay stations in which the wireless link state has changed. Thus, when the transmission bandwidth has been degenerated only in some transmission paths between relay stations, transmission data of an excessive bandwidth in which transmission for all data is difficult flows into a network and congestion occurs. In addition, a degeneration factor of some transmission bandwidths between relay stations is not limited to AMR, and there also is another factor such as congestion due to a failure of a transmission link or the like.

The present invention has been made in view of the above-described circumstances, and an object of the invention is to provide technology for preventing congestion from occurring due to a change in a transmission bandwidth between relay stations in a transmission network of a multi-hop connection in which the transmission bandwidth between the relay stations changes.

Means for Solving the Problem

According to an aspect of the present invention, there is provided a transmission device connected to a network constituted of a plurality of relay stations, including: a transmission section which transmits a signal to the network; and a bandwidth control section which controls a transmission bandwidth of the transmission section based on a lowest transmission bandwidth among transmission bandwidths between the relay stations.

According to another aspect of the present invention, there is provided a bandwidth control method, which is performed by a transmission device connected to a network constituted of a plurality of relay stations, including: a transmission step of transmitting, by the transmission device, a signal to the network; and a bandwidth control step of controlling, by the transmission device, a transmission bandwidth in the transmission step based on a lowest transmission bandwidth among transmission bandwidths between the relay stations.

According to still another aspect of the present invention, there is provided a computer program for causing a computer connected to a network constituted of a plurality of relay stations to execute: a transmission step of transmitting a signal to the network; and a bandwidth control step of controlling a transmission bandwidth in the transmission step based on a lowest transmission bandwidth among transmission bandwidths between the relay stations.

Effect of the Invention

According to the present invention, it is possible to prevent congestion from occurring due to a change in a transmission bandwidth between relay stations in a transmission network of a multi-hop connection in which the transmission bandwidth between the relay stations changes.

BRIEF DESCRIPTION OF THE DRAWINGS

FIG. 3A is a diagram illustrating a specific configuration example of a packet relay station 10-2 communicably connected to a plurality of packet relay stations 10.

EMBODIMENTS FOR CARRYING OUT THE INVENTION

Figure 1:
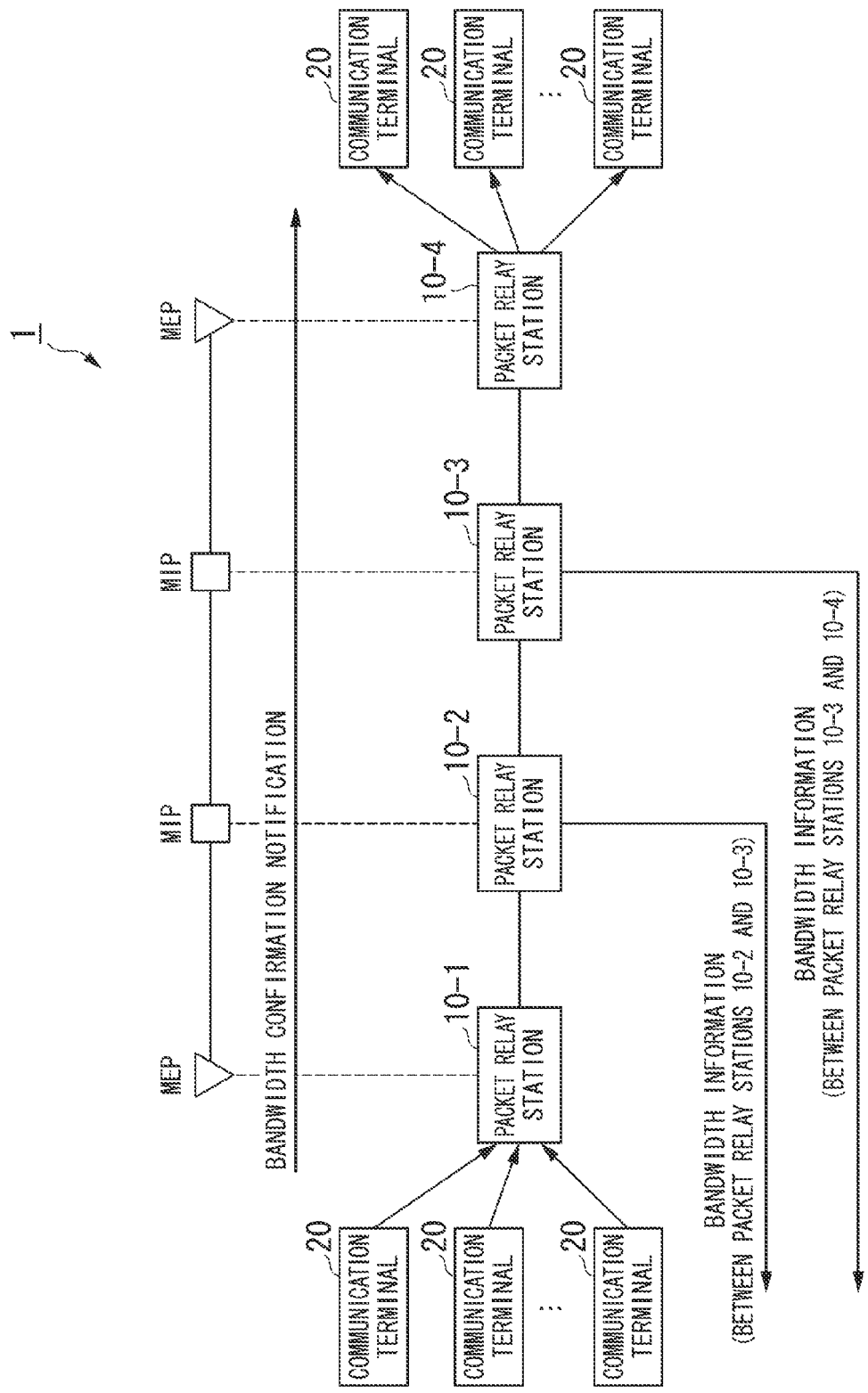
FIG. 1 is a system configuration diagram illustrating a system configuration of a packet transmission system 1.

FIG. 1 is a system configuration diagram illustrating a system configuration of a packet transmission system 1. The packet transmission system 1 is configured using a plurality of packet relay stations 10-1 to 10-4 and a plurality of communication terminals 20. Each packet relay station 10 wirelessly communicably connected to another specific packet relay station 10 transmits and receives a packet. In the case of FIG. 1, the packet relay stations 10-1 and 10-2 are wirelessly communicably connected to each other, the packet relay stations 10-2 and 10-3 are wirelessly communicably connected to each other, and the packet relay stations 10-3 and 10-4 are wirelessly communicably connected to each other. In addition, a plurality of communication terminals 20 are communicably connected to the packet relay stations 10-1 and 10-4. A transmission path between the communication terminal 20 and the packet relay station 10-1 is not limited to wireless communication, and may be formed by wired communication such as a local area network (LAN). Likewise, a transmission path between the communication terminal 20 and the packet relay station 10-4 is not limited to the wireless communication either, and may be formed by wired communication such as the LAN.

In the packet transmission system 1, a traffic channel is preset. In the case of FIG. 1, an end-to-end traffic channel from the packet relay station 10-1 to the packet relay station 10-4 is set. That is, a traffic channel that reaches from the packet relay station 10-1 to the packet relay station 10-4 via the packet relay stations 10-2 and 10-3 is set. In the traffic channel, for example, data transmitted from the communication terminal 20 is transmitted.

In the packet transmission system 1, a maintenance entity group end point (MEP) and a maintenance entity group intermediate point (MIP) of Ethernet (registered trademark) OAM are set. For example, in the case of FIG. 1, the packet relay stations 10-1 and 10-4 are set as MEPs. In addition, the packet relay stations 10-2 and 10-3 are set as MIPs. Specifically, the MEPs belonging to the same group are set for the packet relay stations 10-1 and 10-4. In addition, the MIPs are set for the packet relay stations 10-2 and 10-3 located between the MEPs.

An individual ETH-OAM frame is transmitted along traffic between the packet relay stations 10-1 and 10-4 by setting the MEPs and the MIPs as described above. In the packet transmission system 1, a packet relay station 10 (the packet relay station 10-1 in the case of FIG. 1; hereinafter referred to as an "end point packet relay station 10) serving as an end point of a transmission side of traffic requests packet relay stations 10 (the packet relay stations 10-2 and 10-3 in the case of FIG. 1; hereinafter referred to as "non-end point packet relay stations 10) located in the middle of a path of traffic to provide notification of information regarding bandwidths.

The notification request for the information regarding the bandwidths (hereinafter referred to as "bandwidth information") is made by transmission of a bandwidth confirmation notification frame. The bandwidth confirmation notification frame stores data (bandwidth confirmation notification identifier (ID)) indicating the bandwidth information notification request, for example, in a predetermined field of a vender-specific OAM function (VSP) of OAM. Each non-end point packet relay station 10 receiving the bandwidth confirmation notification frame generates a bandwidth information frame. The bandwidth information frame stores bandwidth information, for example, in a predetermined field of VSP of OAM. The non-end point packet relay station 10 transmits the bandwidth information frame to the end point packet relay station 10, which is a transmission source of the bandwidth confirmation notification frame.

For example, the packet relay station 10-2 provides notification of bandwidth information of a transmission path between the packet relay stations 10-2 and 10-3. In addition, for example, the packet relay station 10-3 provides notification of bandwidth information of a transmission path between the packet relay stations 10-3 and 10-4. The packet relay station 10-1 acquires bandwidth information of a transmission path between the packet relay stations 10-1 and 10-2 in its own device. In the packet transmission system 1, the occurrence of congestion is prevented by transmission/reception of the above-described bandwidth information. Which packet relay station 10 provides notification of bandwidth information of which transmission path need not be limited to the above-described example, and may be appropriately set.

The configuration of the packet transmission system 1 illustrated in FIG. 1 is only an example. The number of packet relay stations 10 provided in the packet transmission system 1, a connection relationship, a traffic path, and the like may be appropriately changed. In addition, a packet relay station 10 to be set as an MEP or MIP may be appropriately changed. In addition, instead of a plurality of communication terminals 20, one communication terminal 20 may be connected to the packet relay station 10. In addition, a packet relay station, another communication device, or a communication terminal 20 (not illustrated) may be further connected to each of the packet relay stations 10-1 to 10-4.

Figure 2A:
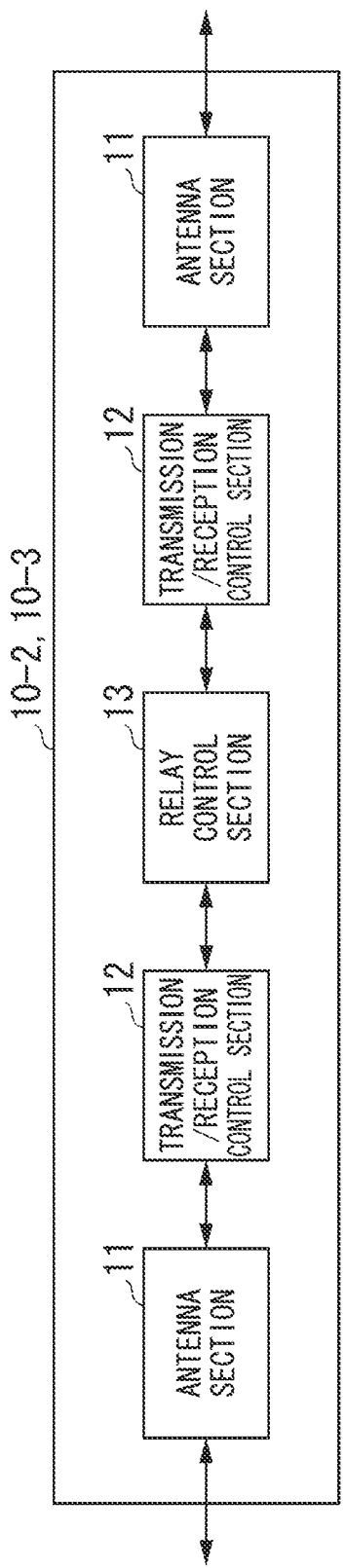
FIG. 2A is a diagram schematically illustrating a configuration of a packet relay station 10 communicably connected to a plurality of packet relay stations 10.

FIG. 2A is a diagram schematically illustrating a configuration of the packet relay station 10 (10-2 or 10-3 in the case of FIG. 1) communicably connected to a plurality of packet relay stations 10. In the case of FIG. 2A, the packet relay station 10 includes a plurality of antenna sections 11, a plurality of transmission/reception control sections 12, and a relay control section 13.

The antenna section 11 transmits/receives a radio signal to/from the antenna section 11 of another packet relay station 10 wirelessly communicably connected thereto. The antenna section 11 transmits a signal (hereinafter referred to as a "transmission signal") to be transmitted after being received from the transmission/reception control section 12 to the antenna section 11 of another packet relay station 10 wirelessly communicably connected thereto. In addition, the antenna section 11 receives a signal from the antenna section 11 of another packet relay station 10 wirelessly communicably connected thereto, and passes the received signal (hereinafter referred to as a "reception signal") to the transmission/reception control section 12.

The transmission/reception control section 12 performs a demodulation process or a decoding process for the reception signal, and restores a packet (hereinafter referred to as "reception packet") corresponding to the reception signal. The transmission/reception control section 12 identifies the reception packet and performs an OAM process or the like. Upon receipt of a general packet as the reception packet, the transmission/reception control section 12 passes the reception packet to the relay control section 13. The general packet is a packet that is not an ETH-OAM frame. For example, the general packet is a packet of user data. In addition, the transmission/reception control section 12 passes the reception packet to the relay control section 13 upon receipt of the ETH-OAM frame not addressed from the antenna section 11 to its own device. In addition, upon receipt of a packet (hereinafter referred to as a "transmission packet") to be transmitted from the relay control section 13, the transmission/reception control section 12 performs an encoding process or a modulation process to generate a transmission signal. The transmission/reception control section 12 transmits the transmission signal via the antenna section 11.

The relay control section 13 performs a relay process based on header information or the like for the reception packet received from the transmission/reception control section 12. The relay process that is performed by the relay control section 13 is implemented using existing technology.

Figure 2B:
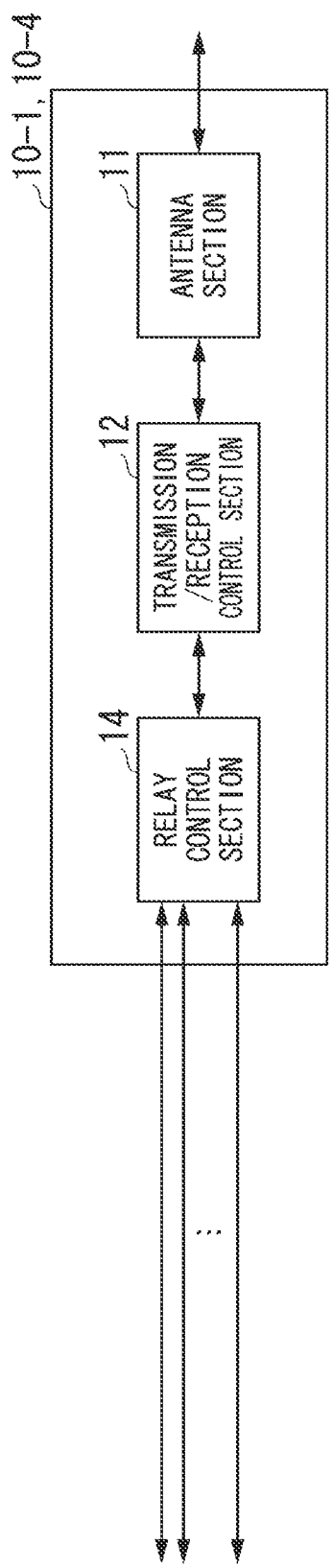
FIG. 2B is a diagram schematically illustrating a configuration of a packet relay station 10 communicably connected to one packet relay station 10 and a plurality of communication terminals 20.

FIG. 2B is a diagram schematically illustrating a configuration of the packet relay station 10 (10-1 or 10-4 in the case of FIG. 1) communicably connected to one packet relay station 10 and a plurality of communication terminals 20. In the case of FIG. 2B, the packet relay station 10 includes an antenna section 11, a transmission/reception control section 12, and a relay control section 14. The configurations of the antenna section 11 and the transmission/reception control section 12 in FIG. 2B are the same as those of the antenna section 11 and the transmission/reception control section 12 in FIG. 2A. The relay control section 14 is different from the relay control section 13 in that connections to the plurality of communication terminals 20 are established. The relay control section 14 performs a relay process based on header information or the like for a packet received from the communication terminal 20. In addition, the relay control section 14 performs a relay process based on header information or the like for a reception packet received from the transmission/reception control section 12. The relay process to be performed by the relay control section 14 is implemented using existing technology. In the following description, it is assumed that the relay control section 13 is provided in the non-end point packet relay station 10, and the relay control section 14 is provided in the end point packet relay station 10. However, whether the relay control section 13 is provided and whether the relay control section 14 is provided are determined by whether a plurality of transmission paths connected to the packet relay station 10 are all wireless transmission paths or include wired transmission paths. Thus, the relay control section 14 may be provided in the non-end point packet relay station 10 or the end point packet relay station 10.

FIG. 3A is a diagram illustrating a specific configuration example of the packet relay station 10-2 communicably connected to a plurality of packet relay stations 10. One antenna section 11 may be connected to the transmission/reception control section 12 of the packet relay station 10-2 as illustrated in FIG. 3A, or a plurality of antenna sections 11 may be connected thereto. In the case of FIG. 3A, the antenna section 11 for wirelessly communicating with the packet relay station 10-1 is connected to the left transmission/reception control section 12. In addition, the antenna section 11 for wirelessly communicating with the packet relay station 10-3 is connected to the right transmission/reception control section 12.

Figure 3B:
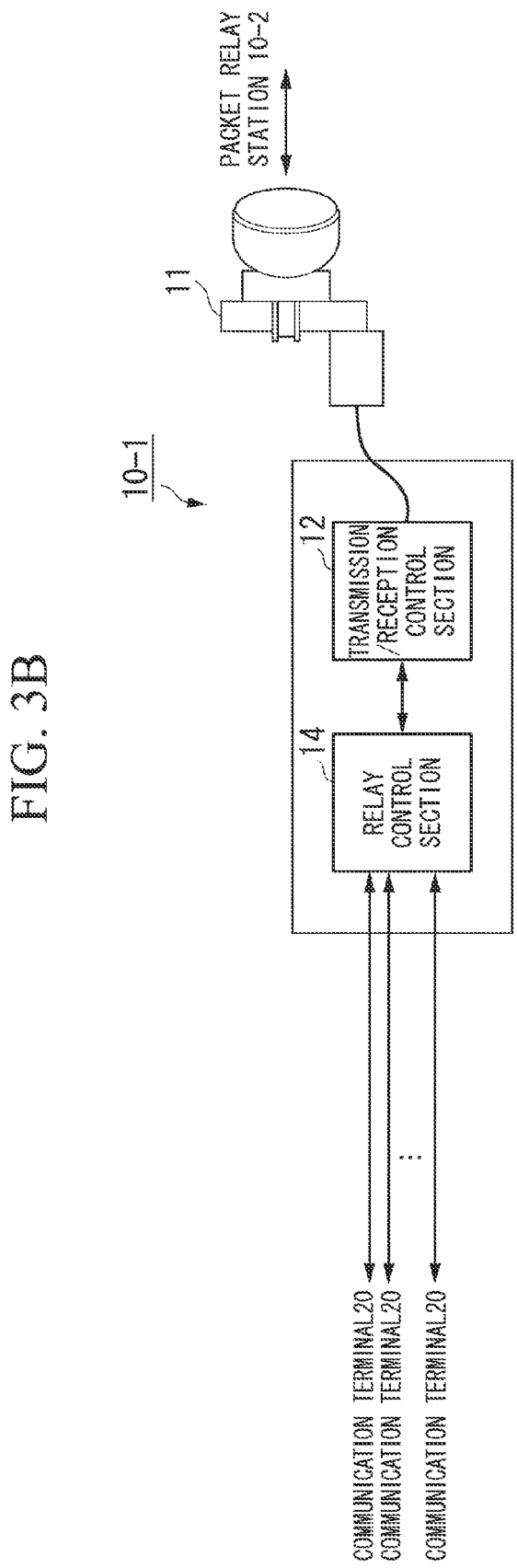
FIG. 3B is a diagram illustrating a specific configuration example of a packet relay station 10-1 communicably connected to one packet relay station 10 and a plurality of communication terminals 20.

FIG. 3B is a diagram illustrating a specific configuration example of the packet relay station 10-1 communicably connected to one packet relay station 10 and a plurality of communication terminals 20. One antenna section 11 may be connected to the transmission/reception control section 12 of the packet relay station 10-1 as illustrated in FIG. 3B, or a plurality of antenna sections 11 may be connected thereto. In the case of FIG. 3B, the plurality of communication terminals 20 are connected to the relay control section 14 via a wired transmission path such as a LAN. In addition, an antenna section 11 for wirelessly communicating with the packet relay station 10-2 is connected to the transmission/reception control section 12.

Each antenna section 11 provided in each packet relay station 10 may be configured to wirelessly communicate with another antenna section 11 disposed facing the antenna section 11 using radio waves having strong directivity, for example, such as microwaves. In addition, each antenna section 11 may be configured to perform wireless communication by another scheme.

The configuration of the transmission control section 12 provided in the packet relay station 10 is different between the end point packet relay station 10 and the non-end point packet relay station 10. Hereinafter, the configurations of transmission/reception control sections 12 will be described.

Figure 4:
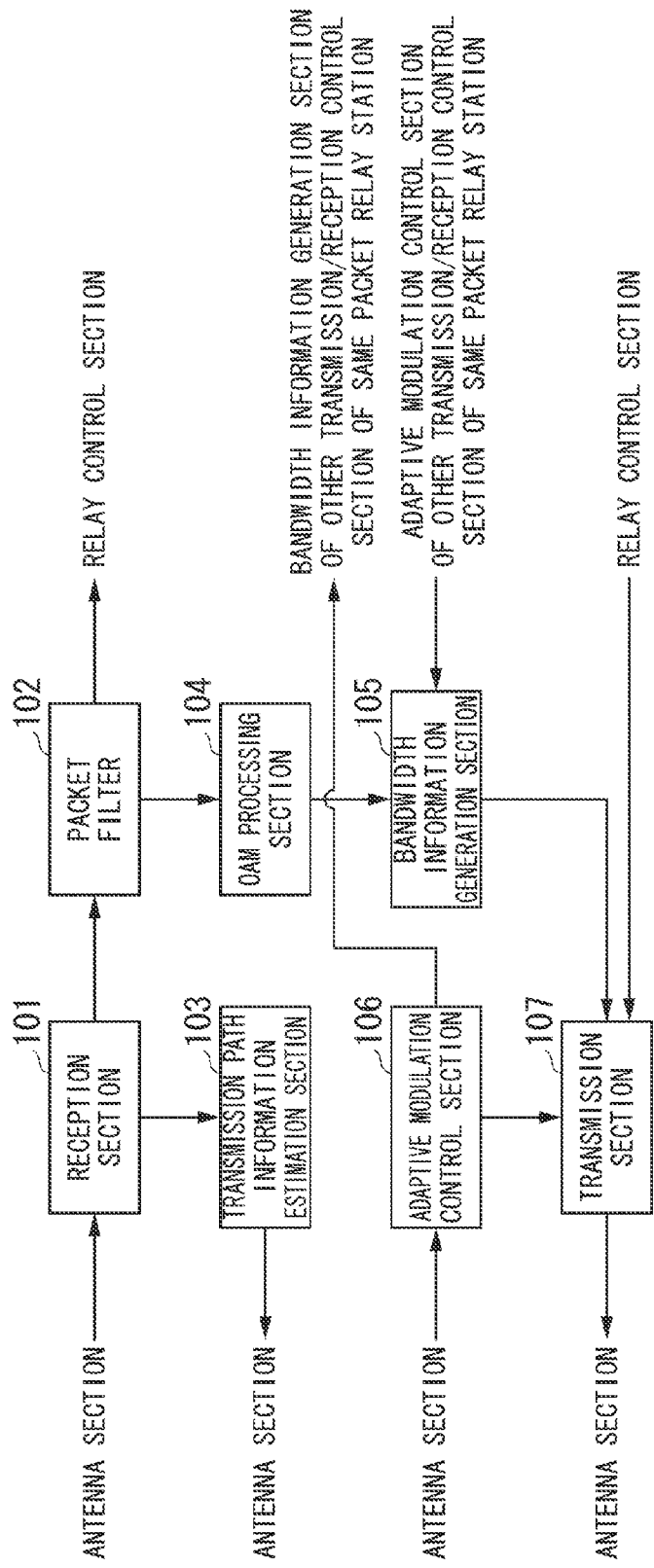
FIG. 4 is a schematic block diagram schematically illustrating a functional configuration of a transmission/reception control section 12-1 of a non-end point packet relay station 10.

FIG. 4 is a schematic block diagram schematically illustrating a functional configuration of the transmission/reception control section 12 (hereinafter referred to as the "transmission/reception control section 12-1) of the non-end point packet relay station 10. The transmission/reception control section 12-1 includes a central processing unit (CPU), a memory, an auxiliary storage device, and/or the like connected by a bus, and executes a non-end point transmission/reception control program. The transmission/reception control section 12-1 functions as a device including a reception section 101, a packet filter 102, a transmission path information estimation section 103, an OAM processing section 104, a bandwidth information generation section 105, an adaptive modulation control section 106, and a transmission section 107 by executing the non-end point transmission/reception control program. All or some functions of the transmission/reception control section 12-1 may be implemented using hardware such as an application specific integrated circuit (ASIC), a programmable logic device (PLD), and/or a field programmable gate array (FPGA). The non-end point transmission/reception control program may be recorded on a computer-readable recording medium. An example of the computer-readable recording medium is a flexible disk, a magneto-optical disc, a read only memory (ROM), a portable medium such as a compact disc-ROM (CD-ROM), or a storage device such as a hard disk embedded in a computer system. In addition, all or part of hardware such as a CPU or memory provided in the transmission/reception control section 12-1 may be shared by the relay control section 13 or another transmission/reception control section 12.

Upon receipt of a reception signal from the antenna section 11, the reception section 101 performs a reception process such as a demodulation process or a decoding process to restore a reception packet. The reception section 101 passes the reception packet to the packet filter 102. In addition, the reception section 101 provides the transmission path information estimation section 103 with information necessary for the transmission path information estimation section 103 to estimate transmission path information. For example, the reception section 101 provides the transmission path information estimation section 103 with signal strength (signal level) of the reception signal or an error rate in the decoding process. In addition, the transmission path information indicates a state of a transmission path, and includes information representing a transmission bandwidth.

The packet filter 102 determines whether or not the reception packet is an ETH-OAM frame. If the reception packet is the ETH-OAM frame, the packet filter 102 passes the reception packet to the OAM processing section 104. On the other hand, if the reception packet is not the ETH-OAM frame, the packet filter 102 passes the reception packet to the relay control section 13.

The transmission path information estimation section 103 estimates the transmission path information of wireless communication with the packet relay station 10 (hereinafter referred to as the "transmission source packet relay station 10"), which is a transmission source of a signal subjected to the reception process in the reception section 101, based on the information provided from the packet reception section 101. A transmission path information estimation process to be performed by the transmission path information estimation section 103 is implemented by existing technology. The transmission path information estimation section 103 transmits the estimation result of the transmission path information to the transmission source packet relay station 10 via the antenna section 11.

Upon receipt of the reception packet from the packet filter 102, the OAM processing section 104 determines whether or not the reception packet (ETH-OAM frame) is a bandwidth confirmation notification frame. If the ETH-OAM frame is the bandwidth confirmation notification frame, the OAM processing section 104 passes the bandwidth confirmation notification frame to the bandwidth information generation section 105. On the other hand, if the ETH-OAM frame is not the bandwidth confirmation notification frame, the OAM processing section 104 performs an OAM process based on the ETH-OAM frame. The OAM process to be performed by the OAM processing section 104 is implemented using existing technology.

Upon receipt of the bandwidth confirmation notification frame from the OAM processing section 104, the bandwidth information generation section 105 acquires bandwidth information and generates a bandwidth information frame. The bandwidth information generation section 105 acquires current bandwidth information based on a modulation scheme or an encoding scheme which is provided by the bandwidth information generation section 105 and is currently performed by the adaptive modulation control section 106 of another transmission/reception control section 12 of the packet relay station 10. For example, the bandwidth information generation section 105 provided in the left transmission/reception control section 12 in FIG. 3A acquires current bandwidth information based on a process of the adaptive modulation control section 106 provided in the right transmission/reception control section 12 of the same device. That is, bandwidth information acquired by the bandwidth information generation section 105 is bandwidth information of a transmission path in which the packet relay station 10 serves as the transmission source packet relay station and which is provided by the bandwidth information generation section 105. The bandwidth information generation section 105 generates a bandwidth information frame by storing the generated bandwidth information in VSP. The bandwidth information generation section 105 transmits the generated bandwidth information frame to the end point packet relay station 10 via the transmission section 107.

The adaptive modulation control section 106 receives the transmission path information via the antenna section 11. The transmission path information received by the adaptive modulation control section 106 is information which is provided by the adaptive modulation control section 106 and is estimated by the transmission path information estimation section 103 of the packet relay station 10 of a reception side in the transmission path in which the packet relay station 10 serves as the transmission source packet relay station. The adaptive modulation control section 106 determines a scheme of an encoding process or a modulation process to be performed when the transmission section 107 generates a transmission signal based on the received transmission path information. The adaptive modulation control section 106 performs a process based on existing adaptive modulation technology.

The transmission section 107 generates a transmission signal by performing a transmission process such as an encoding process or a modulation process for a packet received from the relay control section 13 or a bandwidth information frame received from the bandwidth information generation section 105.

Figure 5:
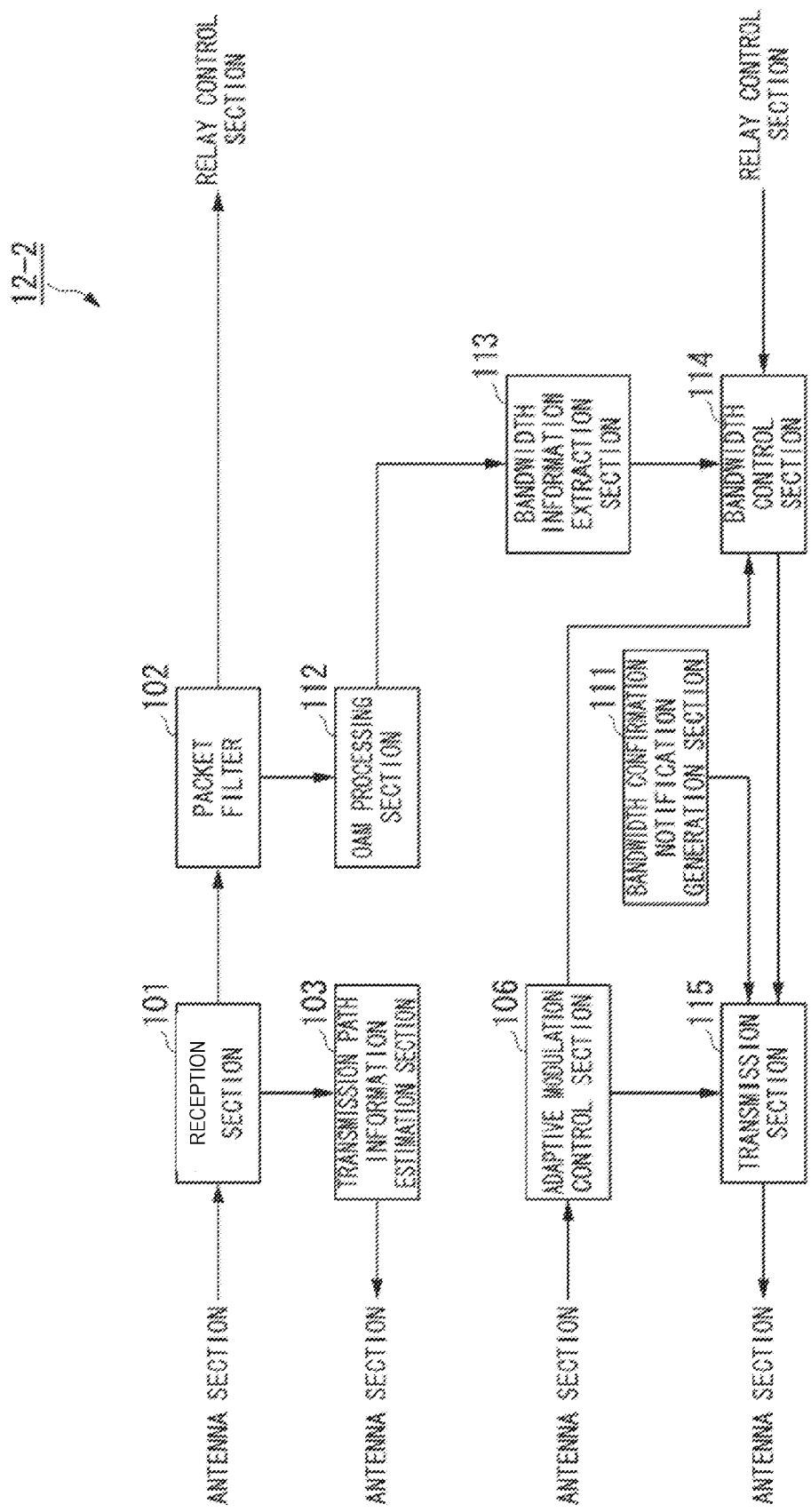
FIG. 5 is a schematic block diagram illustrating a functional configuration of a transmission/reception control section 12-2 of an end point packet relay station 10.

FIG. 5 is a schematic block diagram illustrating a functional configuration of the transmission/reception control section 12 (hereinafter referred to as the "transmission/reception control section 12-2") of the end point packet relay station 10. The transmission/reception control section 12-2 includes a CPU, a memory, an auxiliary storage device, and/or the like connected by a bus, and executes an end point transmission/reception control program. The transmission/reception control section 12-2 functions as a device including a reception section 101, a packet filter 102, a transmission path information estimation section 103, an adaptive modulation control section 106, a bandwidth confirmation notification generation section 111, an OAM processing section 112, a bandwidth information extraction section 113, a bandwidth control section 114, and a transmission section 115 by executing the end point transmission/reception control program. All or some functions of the transmission/reception control section 12-2 may be implemented using hardware such as an ASIC, a PLD, and/or an FPGA. The end point transmission/reception control program may be recorded on a computer-readable recording medium. In addition, all or part of hardware such as a CPU or memory provided in the transmission/reception control section 12-2 may be shared by the relay control section 14 or another transmission/reception control section 12.

Among the configurations provided in the transmission/reception control section 12-2, the configurations of the reception section 101, the packet filter 102, the transmission path information estimation section 103, and the adaptive modulation control section 106 are the same as those of the transmission/reception control section 12-1. Thus, description of the above-described configurations is omitted.

The bandwidth confirmation notification generation section 111 generates a bandwidth confirmation notification frame at a predetermined timing. The predetermined timing may be, for example, when a predetermined time (for example, 1 minute, 10 minutes, 1 hour, or the like) has elapsed, when a predetermined number of packets are transmitted or received, or another timing. The bandwidth confirmation notification frame is an ETH-OAM frame for requesting the non-end point packet relay station 10 to provide notification of bandwidth information. The bandwidth confirmation notification generation section 111 generates a bandwidth confirmation notification frame by storing predetermined information in VSP. The bandwidth confirmation notification generation section 111 transmits the generated bandwidth confirmation notification frame to each non-end point packet relay station 10 via the transmission section 115.

Upon receipt of the reception packet from the packet filter 102, the OAM processing section 112 determines whether or not the reception packet (ETH-OAM frame) is the bandwidth information frame. If the ETH-OAM frame is the bandwidth information frame, the OAM processing section 112 passes the bandwidth information frame to the bandwidth information extraction section 113. On the other hand, if the ETH-OAM frame is not the bandwidth information frame, the OAM processing section 112 performs an OAM process based on the ETH-OAM frame. The OAM process that is performed by the OAM processing section 112 is implemented using existing technology.

Upon receipt of the bandwidth information frame from the OAM processing section 112, the bandwidth information extraction section 113 extracts bandwidth information from the bandwidth information frame. The bandwidth information extraction section 113 passes the extracted bandwidth information to the bandwidth control section 114.

The bandwidth control section 114 receives bandwidth information of each non-end point packet relay station 10 from the bandwidth information extraction section 113. In addition, the bandwidth control section 114 receives bandwidth information of its own device from the adaptive modulation control section 106. The bandwidth control section 114 selects a lowest transmission bandwidth among transmission bandwidths between packet relay stations. The bandwidth control section 114 controls the transmission section 115 to perform a transmission process in the selected lowest transmission bandwidth.

The transmission section 115 performs a modulation process and an encoding process corresponding to an adaptive modulation process in a range that does not exceed a transmission bandwidth that is controlled by the bandwidth control section 114, and performs transmission. Bandwidth control by the bandwidth control section 114 has higher priority than control by the adaptive modulation control section 106. Even when the encoding process and the modulation process designated by the adaptive modulation control section 106 are performed, the transmission section 115 generates a transmission signal in the encoding process and the modulation process designated by the adaptive modulation control section 106 when the transmission bandwidth does not exceed the transmission bandwidth designated by the bandwidth control section 114. On the other hand, if the transmission bandwidth exceeds the transmission bandwidth designated by the bandwidth control section 114 when the encoding process and the modulation process designated by the adaptive modulation control section 106 are performed, the transmission section 115 generates a transmission signal in the encoding process and the modulation process in which the transmission bandwidth does not exceed the transmission bandwidth controlled by the bandwidth control section 114. In this case, the encoding process and the modulation process that are performed by the transmission section 115 are different from the encoding process and the modulation process designated from the adaptive modulation control section 106. It is only necessary for the transmission section 115 to perform transmission so that the transmission bandwidth does not exceed the transmission bandwidth designated by the low frequency control section 114. The transmission bandwidth may be adjusted by any method. For example, the transmission bandwidth may be adjusted by changing the encoding process and the modulation process as described above. The transmission bandwidth may be adjusted by providing a transmission buffer to buffer a transmission packet and delaying a transmission timing.

Figure 6A:
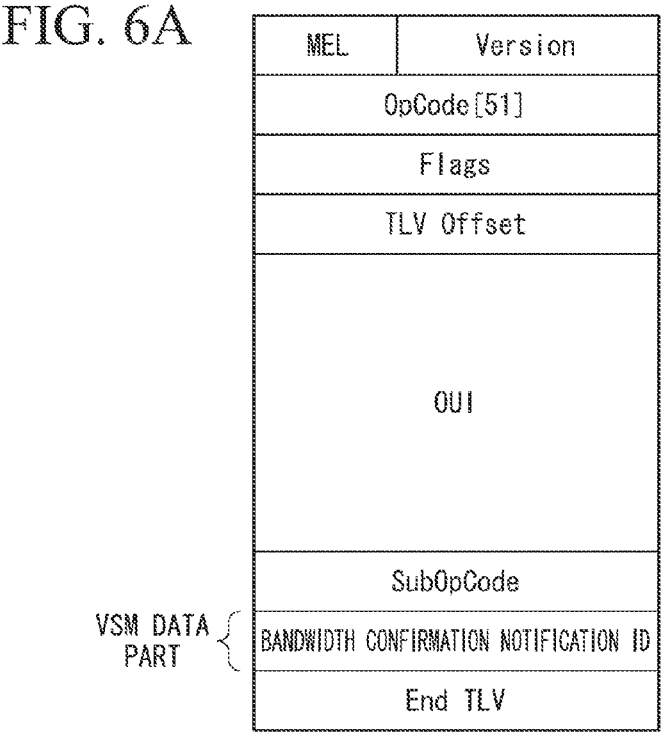
FIG. 6A is a diagram illustrating a specific example of a format of a bandwidth confirmation notification frame among Ethernet (ETH)-OAM frames.

FIG. 6A is a diagram illustrating a format of the bandwidth confirmation notification frame among ETH-OAM frames. The bandwidth confirmation notification frame is generated by providing a field for storing a bandwidth confirmation notification ID for an ETH-vender-specific message (VSM) frame, which is a type of ETH-OAM frame. The format of the ETH-VSM frame is defined in International Telecommunication Union Telecommunication Standardization Sector (ITU-T) G.1731. The field for storing the bandwidth confirmation notification ID is provided, for example, in a VSM data part. More specifically, the bandwidth confirmation notification frame is configured, for example, by inserting the field of the bandwidth confirmation notification ID between a sub operation code (SubOpCode) field and an END type, length, and value (TLV) field of the ETH-VSM frame. In the bandwidth confirmation notification ID field, a predetermined value indicating the bandwidth confirmation notification frame is stored as the bandwidth confirmation notification ID.

Figure 6B:
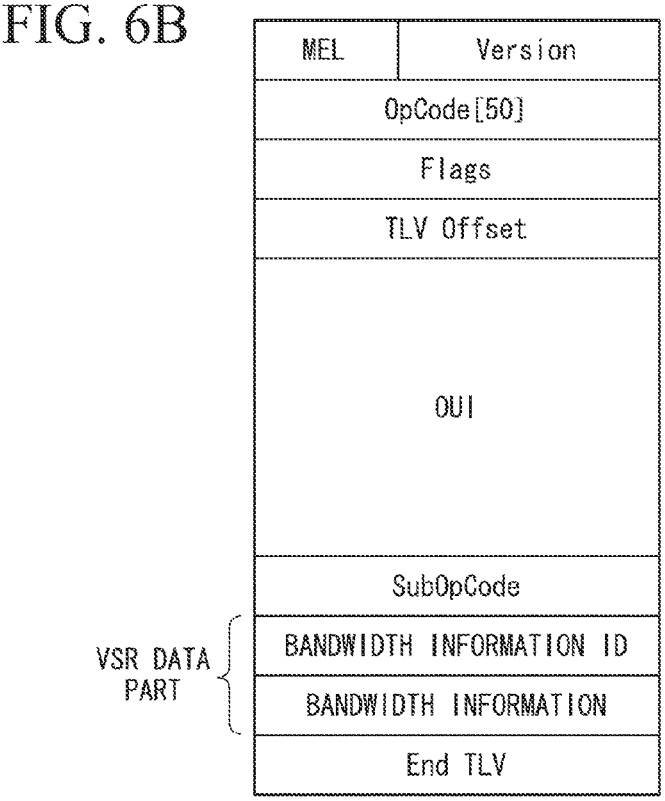
FIG. 6B is a diagram illustrating a format of a bandwidth information frame among ETH-OAM frames.

FIG. 6B is a diagram illustrating a format of the bandwidth information frame. The bandwidth information frame is generated by providing a field for storing a bandwidth information ID and a field for storing bandwidth information for the ETH-vender-specific reply (VSR) frame, which is a type of ETH-OAM frame. The format of the ETH-VSR frame is defined in ITU-T G.1731. The field for storing the bandwidth information ID and the field for storing the bandwidth information are provided, for example, in a VSR data part. More specifically, the bandwidth information frame is configured, for example, by inserting the bandwidth information ID field and the bandwidth information field between a SubOpCode field and an END TLV field of the ETH-VSR frame. A predetermined value representing the bandwidth information frame is stored as the bandwidth information ID in the bandwidth information ID field. In addition, the bandwidth information is stored in the bandwidth information field.

Figure 7:
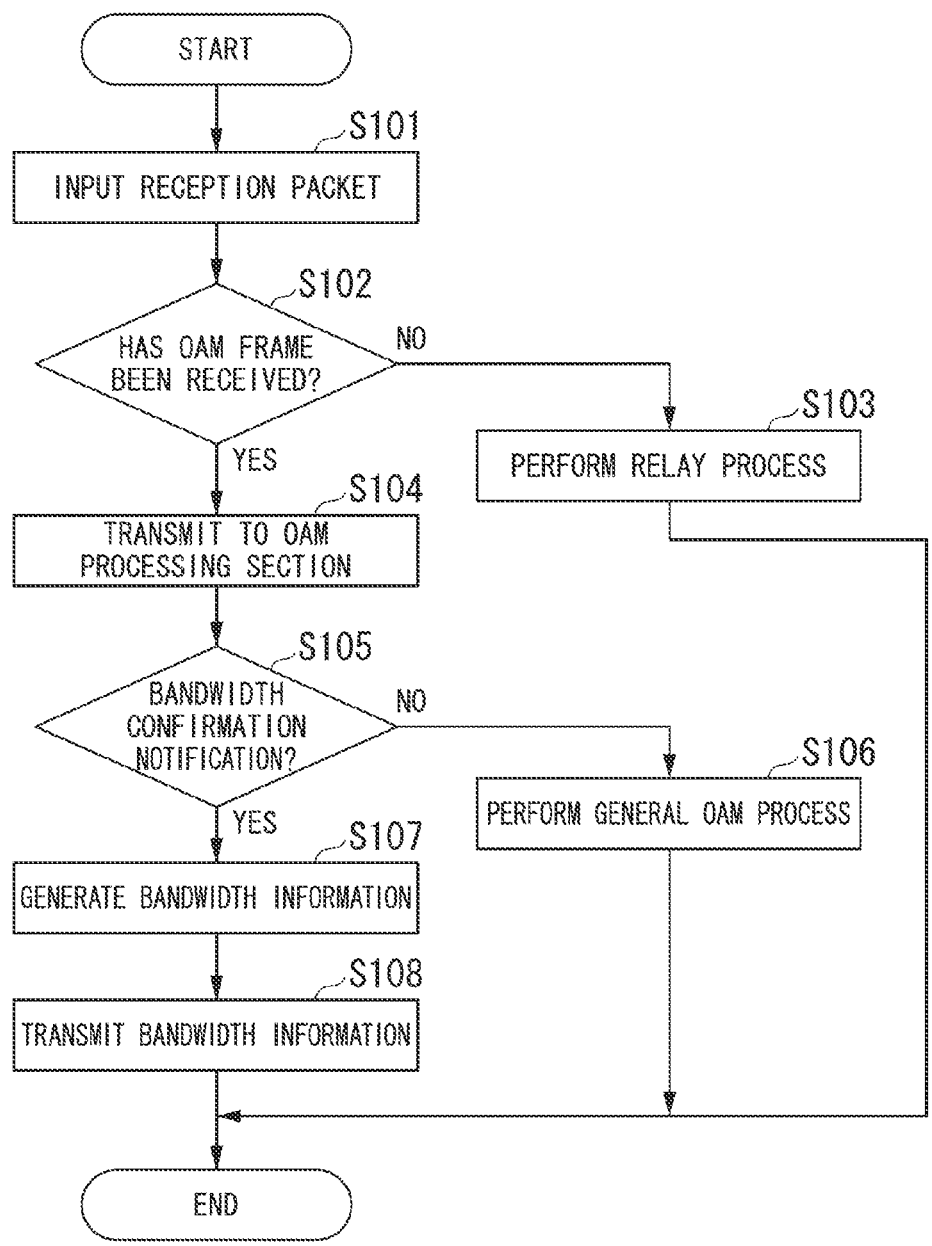
FIG. 7 is a flowchart illustrating a flow of an operation of the transmission/reception control section 12-1 of the non-end point packet relay station 10.

FIG. 7 is a flowchart illustrating a flow of the operation of the transmission/reception control section 12-1 of the non-end point packet relay station 10. The reception section 101 first receives a reception signal and inputs a reception packet to the transmission/reception control section 12-1 by restoring the reception packet (step S101). The reception section 101 passes the reception packet to the packet filter 102. Next, the packet filter 102 refers to Ether Type of a header of the reception packet, and determines whether or not the reception packet is an ETH-OAM frame (step S102). If the reception packet is not the ETH-OAM frame (step S102-NO), the packet filter 102 performs a general relay process for the reception packet (step S103). That is, the packet filter 102 passes the reception packet to the relay control section 13. In this case, the relay control section 13 performs the relay process according to a destination of the reception packet. If the reception packet is not the ETH-OAM frame, for example, the reception packet may be a packet of user data or the like. On the other hand, if the reception packet is the ETH-OAM frame (step S102-YES), the packet filter 102 passes the reception packet to the OAM processing section 104 (step S104).

Next, the OAM processing section 104 determines whether or not the reception packet is a bandwidth confirmation notification frame (step S105). The OAM processing section 104 determines whether or not the reception packet is the bandwidth confirmation notification frame based on an OpCode value and a bandwidth confirmation notification ID of a data part of the ETH-OAM frame. If the above-described determination result indicates that the reception packet is not the bandwidth confirmation notification frame (step S105-NO), the OAM processing section 104 executes a general OAM process according to the received ETH-OAM frame (step S106). On the other hand, if the reception packet is the bandwidth confirmation notification frame (step S105-YES), the OAM processing section 104 passes the bandwidth confirmation notification frame to the bandwidth information generation section 105.

Next, the bandwidth information generation section 105 generates a bandwidth information frame according to reception of the bandwidth notification frame (Step S107). The bandwidth information generation section 105 sets a transmission source of the bandwidth confirmation notification frame, that is, an address of the end point packet relay station 10, as a destination of the bandwidth information frame. The transmission section 107 generates a transmission signal by performing the encoding process or the modulation process for the bandwidth information frame, and transmits the generated transmission signal via the antenna section 11 (step S108).

Figure 8:
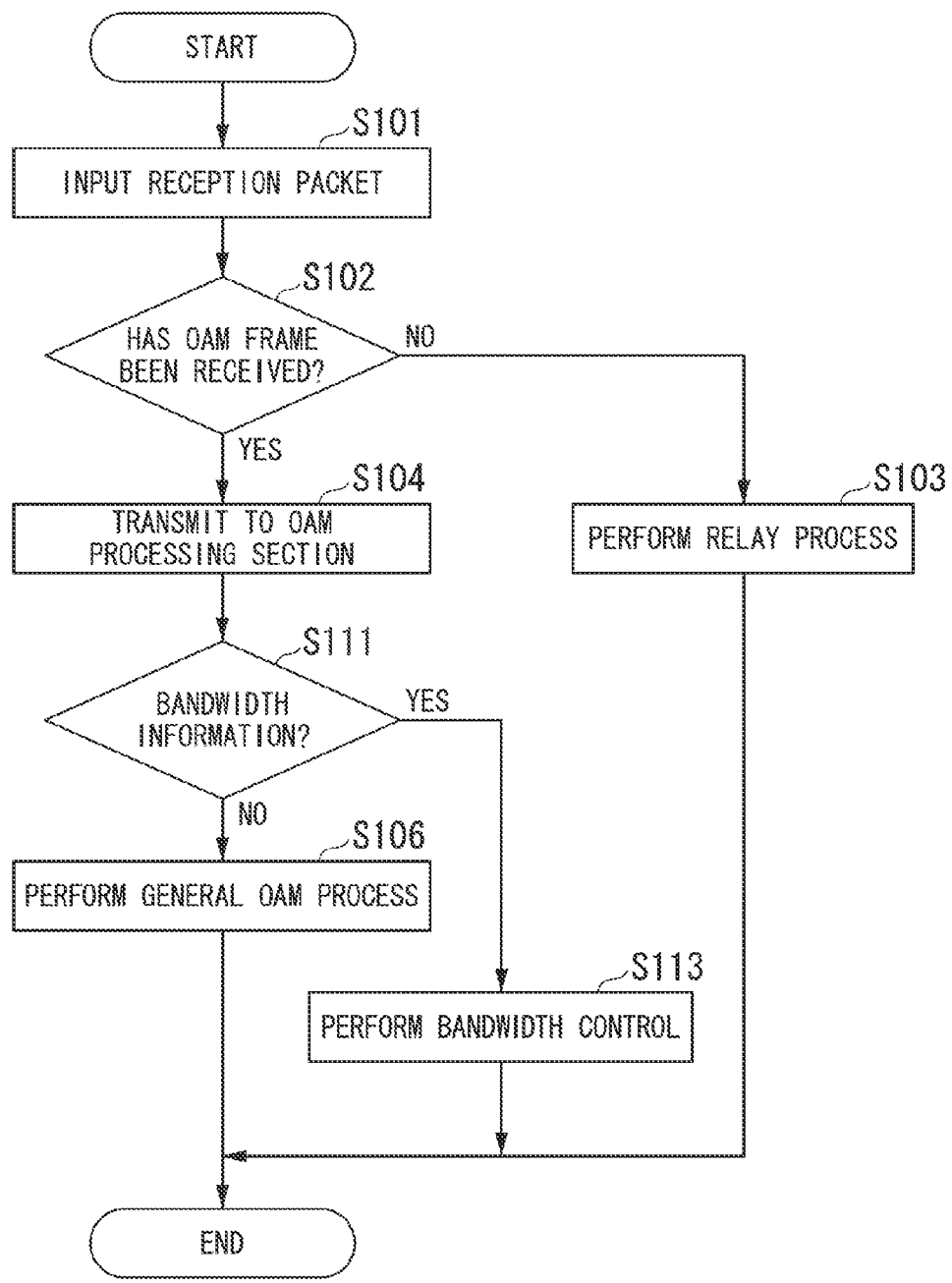
FIG. 8 is a flowchart illustrating a flow of an operation of a transmission/reception control section 12-2 of the end point packet relay station 10.

FIG. 8 is a flowchart illustrating a flow of the operation of the transmission/reception control section 12-2 of the end point packet relay station 10. The reception section 101 first receives a reception signal and inputs a reception packet to the transmission/reception control section 12-2 by restoring the reception packet (step S101). The reception section 101 passes the reception packet to the packet filter 102. Next, the packet filter 102 refers to Ether Type of a header of the reception packet, and determines whether or not a reception packet is an ETH-OAM frame (step S102). If the reception packet is not the ETH-OAM frame (step S102-NO), the packet filter 102 performs a general relay process for the reception packet (step S103). That is, the packet filter 102 passes the reception packet to the relay control section 13. In this case, the relay control section 13 performs the relay process according to a destination of the reception packet. On the other hand, if the reception packet is the ETH-OAM frame (step S102-YES), the packet filter 102 passes the reception packet to the OAM processing section 112 (step S104).

Next, the OAM processing section 112 determines whether or not the reception packet is a bandwidth information frame (step S111). The OAM processing section 112 determines whether or not the reception packet is the bandwidth information frame based on an OpCode value and a bandwidth information ID of a data part of the ETH-OAM frame. If the above-described determination result indicates that the reception packet is not the bandwidth information frame (step S111-NO), the OAM processing section 112 executes a general OAM process according to the received ETH-OAM frame (step S106). On the other hand, if the reception packet is the bandwidth information frame (step S111-YES), the OAM processing section 112 passes the bandwidth information frame to the bandwidth information extraction section 113.

Next, the bandwidth information extraction section 113 extracts the bandwidth information from the bandwidth information frame, and passes the extracted bandwidth information to the bandwidth control section 114. The bandwidth control section 114 acquires bandwidth information of a transmission path with each packet relay station 10 in terms of traffic for which its own serves as an end point. The bandwidth control section 114 selects a lowest transmission bandwidth among transmission bandwidths indicated by the acquired bandwidth information. The bandwidth control section 114 controls the transmission section 115 to perform a transmission process in the selected lowest transmission bandwidth (step S113).

An example in which a state of a wireless link between the packet relay stations 10-2 and 10-3 is deteriorated and a reception level of the packet relay station 10-3 is deteriorated in the operation of the packet transmission system 1 will be described. In this case, the transmission path information estimation section 103 of the packet relay station 10-3 transmits transmission path information based on the deteriorated reception level to the packet relay station 10-2. The adaptive modulation control section 106 of the packet relay station 10-2 receives the transmission path information and degenerates the transmission bandwidth of the transmission section 107 by performing an adaptive modulation process. Upon receipt of a bandwidth confirmation notification frame after degeneration of the transmission bandwidth, the bandwidth information generation section 105 of the packet relay station 10-2 transmits a bandwidth information frame storing a transmission bandwidth after degeneration to the end point packet relay station 10. In this case, the end point packet relay station 10 is the packet relay station 10-1. The bandwidth control section 114 of the packet relay station 10-1 collects a transmission bandwidth between the packet relay stations 10-1 and 10-2, a transmission bandwidth between the packet relay stations 10-2 and 10-3, and a transmission bandwidth between the packet relay stations 10-3 and 10-4. The bandwidth control section 114 controls the transmission section 115 to perform a transmission process in a lowest transmission bandwidth among the transmission bandwidths. In this case, the bandwidth control section 114 controls the transmission section 115 to perform a transmission process in the transmission bandwidth between the packet relay stations 10-2 and 10-3.

In the packet transmission system 1 configured as described above, transmission from the end point packet relay station 10 is performed in a lowest transmission bandwidth among transmission bandwidths between packet relay stations configuring traffic. Thus, it is possible to prevent a signal (packet) of an amount incapable of being processed from flowing from the end point packet relay station 10 into a network of a downstream side. Therefore, efficient transmission can be implemented without causing congestion even between packet relay stations having the lowest transmission bandwidth.

In addition, the packet transmission system 1 has an advantageous effect in that bandwidth information of a non-adjacent packet relay station 10 can be easily collected in the end point packet relay station 10.

MODIFIED EXAMPLES

Figure 9:
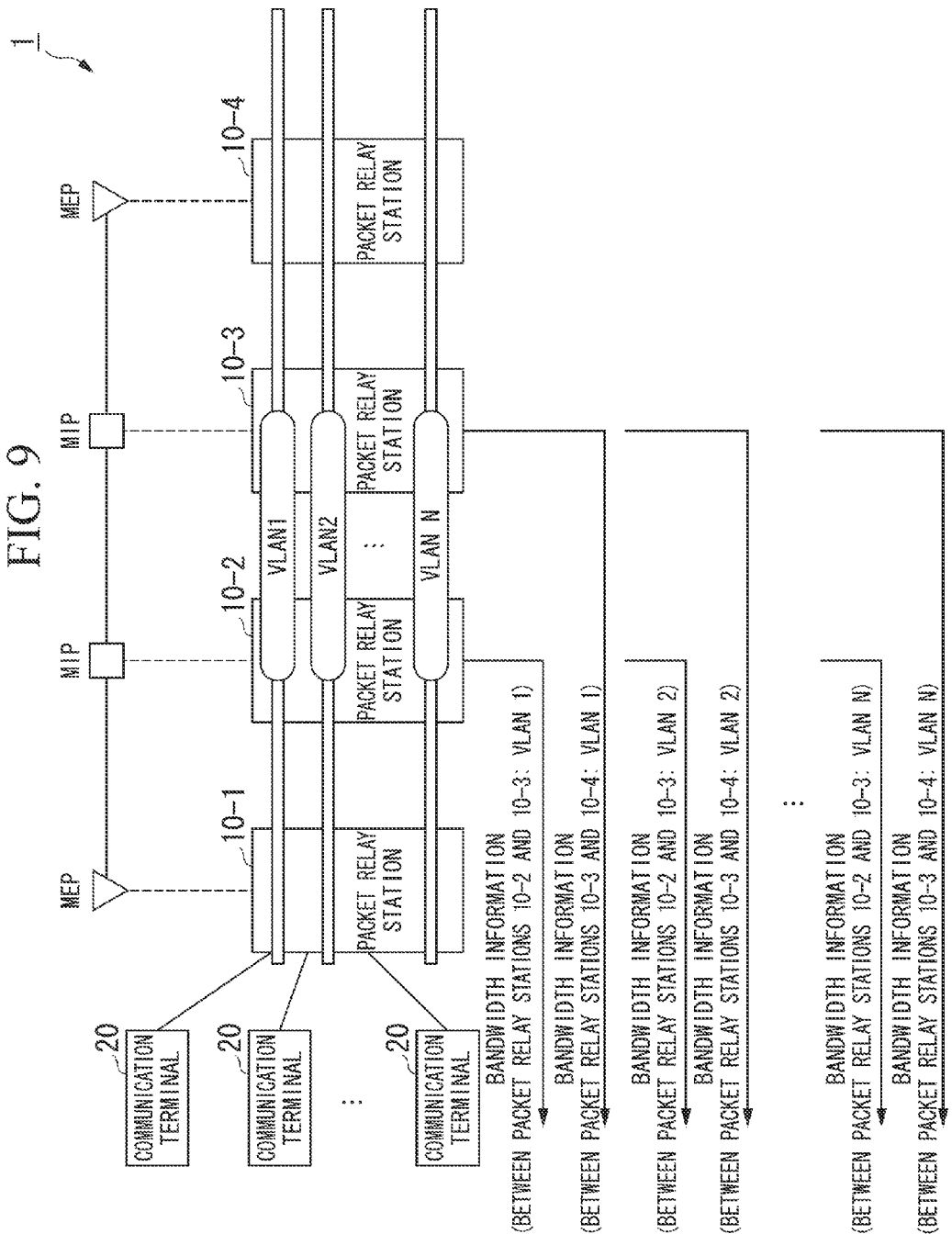
FIG. 9 is a diagram illustrating a modified example of a packet transmission system 1.
Figure 10:
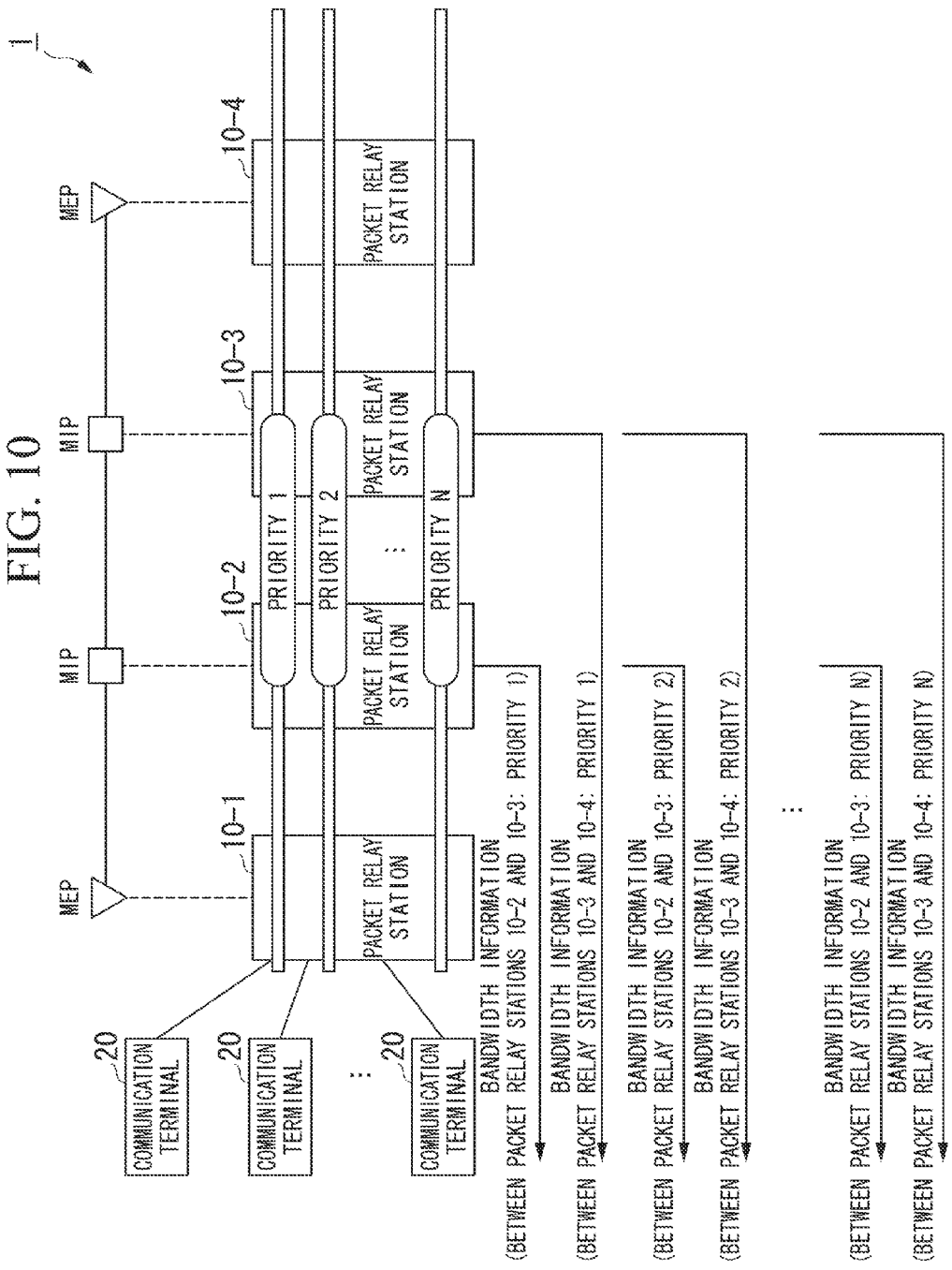
FIG. 10 is a diagram illustrating a modified example of the packet transmission system 1.

FIGS. 9 and 10 are diagrams illustrating the modified examples of the packet transmission system 1. In the embodiment illustrated in FIG. 1, there is one piece of traffic from the packet relay station 10-1 to the packet relay station 10-4. On the other hand, in the modified examples illustrated in FIGS. 9 and 10, the packet transmission system 1 may be configured so that there are a plurality of (n) pieces of traffic from the packet relay station 10-1 to the packet relay station 10-4. As described above, the packet transmission system 1 may be configured so that there are a plurality of pieces of traffic in the same multi-stage hop. In this case, the bandwidth information generation section 105 of each packet relay station 10 notifies the end point packet relay station 10 of bandwidth information for every piece of traffic.

For example, in the case of FIG. 9, there are a plurality of pieces of traffic in units of virtual LANs (VLANs) between the packet relay stations 10-1 to 10-4. In this case, each packet relay station 10 may be connected in wired communication instead of wireless communication. In addition, each packet relay station 10 may not perform adaptive modulation. The transmission bandwidth in each VLAN is changed by the occurrence of congestion or the like, not by adaptive modulation control. The bandwidth information generation sections 105 of the packet relay stations 10-2 and 10-3 collect and report bandwidth information for every piece of traffic. That is, the bandwidth information generation section 105 provides notification of bandwidth information related to each VLAN n (n=1, 2, ⌊, N). In this case, the bandwidth information generation section 105 collects bandwidth information based on the number of packets per time to be transmitted by the transmission section 107, or the like without receiving bandwidth information from the adaptive modulation control section 106. The bandwidth control section 114 of the packet relay station 10-1 selects a lowest transmission bandwidth for every piece of traffic. The bandwidth control section 114 controls the transmission section 115 to perform a transmission process for each piece of traffic in the lowest transmission bandwidth selected for every piece of traffic.

In addition, for example, in the case of FIG. 10, there are a plurality of pieces of traffic divided for every priority among the packet relay stations 10-1 to 10-4. An example of priority is a class of service (CoS) defined by Electrical and Electronics Engineers (IEEE). In this case, each packet relay station 10 may be connected in wired communication instead of wireless communication. In addition, each packet relay station 10 may not perform adaptive modulation. The bandwidth in each priority is changed by the occurrence of congestion or the like, not by adaptive modulation control. The bandwidth information generation sections 105 of the packet relay stations 10-2 and 10-3 collect and report bandwidth information for every piece of traffic. That is, the bandwidth information generation section 105 provides notification of bandwidth information related to each priority n (n=1, 2, ⊏, N). In this case, the bandwidth information generation section 105 collects bandwidth information based on the number of packets per time to be transmitted by the transmission section 115 without receiving bandwidth information from the adaptive modulation control section 106. The bandwidth control section 114 of the packet relay station 10-1 selects a lowest transmission bandwidth for every priority. The bandwidth control section 114 controls the transmission section 115 to perform a transmission process for each piece of traffic in a lowest transmission bandwidth selected for each priority.

In addition, the above-described embodiment in which the configuration of the transmission/reception control section 12-1 provided in the non-end point packet relay station 10 is different from that of the transmission/reception control section 12-2 provided in the end point packet relay station 10 has been described. However, the transmission/reception control section 12 having all configurations of the transmission/reception control sections 12-1 and 12-2 may be constructed, and the above-described transmission/reception control section 12 may be provided in both the non-end point packet relay station 10 and the end point packet relay station 10.

In addition, although a packet or frame is used as a specific example of a PDU in the above-described embodiment, the packet relay station 10 and the packet transmission system 1 may be configured as a transmission device that transmits another PDU.

Although the embodiments of the present invention have been described above with reference to the drawings, specific configurations are not limited to these embodiments, and design changes and the like are also included without departing from the scope of the present invention.

Priority is claimed on Japanese Patent Application No. 2010-123255, filed May 28, 2010, the contents of which are incorporated herein by reference.

INDUSTRIAL APPLICABILITY

In a transmission network of a multi-hop connection in which a transmission bandwidth between relay stations changes, it is possible to prevent congestion from occurring due to a change in the transmission bandwidth between the relay stations.

REFERENCE SYMBOLS 10 (10-1 to 10-4) Packet relay station (transmission device)
20 Communication terminal
11 Antenna section
12 (12-1, 12-2) Transmission/reception control section
13, 14 Relay control section
101 Reception section
102 Packet filter
103 Transmission path information estimation section
104, 112 OAM processing section
105 Bandwidth information generation section
106 Adaptive modulation control section
107, 115 Transmission section
111 Bandwidth confirmation notification generation section
113 Bandwidth information extraction section
114 Bandwidth control section

The invention claimed is:

1. A transmission device connected to a network constituted of a plurality of relay stations, comprising:
 a transmitter that transmits a signal to the network; and
 a processor coupled to the transmitter that collects bandwidth information indicating transmission bandwidths between the relay stations from the relay stations and controls a transmission bandwidth of the transmitter based on a lowest transmission bandwidth among the transmission bandwidths between the relay stations,
 wherein the network is a transmission network of a multi-hop connection in which the transmission bandwidths between the relay stations change, and
 wherein, even when said transmitter is provided with an adaptive modulation function, the adaptive modulation function of the transmitter operates to perform control so that the lowest transmission bandwidth is not exceeded.

2. The transmission device according to claim 1, wherein the processor acquires the transmission bandwidths between the relay stations by receiving the bandwidth information from the plurality of relay stations.

3. The transmission device according to claim 1, wherein:
 the transmission device is provided in a transmission system wherein there are a plurality of pieces of traffic among the relay stations; and
 the bandwidth controller selects the lowest transmission bandwidth for every piece of traffic among transmission bandwidths between the relay stations for every piece of traffic and controls the transmission bandwidth of the transmitter for every piece of traffic based on the lowest transmission bandwidth selected for every piece of traffic.

4. The transmission device according to claim 1, wherein:
 the transmission device is provided in a transmission system wherein there are a plurality of pieces of traffic among the relay stations; and
 the bandwidth controller selects the lowest transmission bandwidth for every priority among transmission bandwidths between the relay stations for every priority and controls the transmission bandwidth of the transmitter for every priority based on the lowest transmission bandwidth selected for every priority.

5. The transmission device according to claim 1, wherein:
 if the transmission bandwidth of the transmitter does not exceed the lowest transmission bandwidth, even when encoding and modulation in accordance with adaptive modulation control are performed, the transmitter generates the signal transmitted to the network by performing the encoding and modulation, so that the transmission bandwidth of the transmitter does not exceed the lowest transmission bandwidth.

6. A bandwidth control method, which is performed by a transmission device connected to a network constituted of a plurality of relay stations, comprising:
- transmitting, by a transmitter of the transmission device, a signal to the network;
- collecting, by the transmission device, bandwidth information indicating transmission bandwidths between the relay stations from the relay stations; and
- controlling, by the transmission device, a transmission bandwidth in the transmission step based on a lowest transmission bandwidth among the transmission bandwidths between the relay stations,
- wherein the network is a transmission network of a multi-hop connection in which the transmission bandwidths between the relay stations change, and
- wherein, even when said transmitter is provided with an adaptive modulation function, the adaptive modulation function of the transmitter operates to perform control so that the lowest transmission bandwidth is not exceeded.

7. A non-transitory computer-readable recording medium in which a computer program is recorded, the computer program causes a computer connected to a network constituted of a plurality of relay stations to execute:
- a transmitter transmitting a signal to the network;
- collecting, by a transmission device, bandwidth information indicating transmission bandwidths between the relay stations from the relay stations; and
- a bandwidth control step of controlling a transmission bandwidth in the transmission step based on a lowest transmission bandwidth among transmission bandwidths between the relay stations,
- wherein the network is a transmission network of a multi-hop connection in which the transmission bandwidths between the relay stations change, and
- wherein, even when said transmitter is provided with an adaptive modulation function, the adaptive modulation function of the transmitter operates to perform control so that the lowest transmission bandwidth is not exceeded.

* * * * *